(12) United States Patent
Nagamatsu et al.

(10) Patent No.: US 7,823,303 B2
(45) Date of Patent: *Nov. 2, 2010

(54) FLUID SHOVEL APPARATUS AND METHOD

(76) Inventors: Brian H. Nagamatsu, 8 Hillock Ct., Glenville, NY (US) 12302; Felicia M. Nagamatsu, 8 Hillock Ct., Glenville, NY (US) 12302

( * ) Notice: Subject to any disclaimer, the term of this patent is extended or adjusted under 35 U.S.C. 154(b) by 0 days.

This patent is subject to a terminal disclaimer.

(21) Appl. No.: 12/218,447

(22) Filed: Jul. 15, 2008

(65) Prior Publication Data

US 2008/0295364 A1    Dec. 4, 2008

Related U.S. Application Data

(63) Continuation-in-part of application No. 12/069,139, filed on Feb. 7, 2008, which is a continuation-in-part of application No. 11/786,233, filed on Apr. 11, 2007.

(51) Int. Cl.
*E01H 5/00* (2006.01)
(52) U.S. Cl. .............................. 37/241; 37/266; 37/270; 37/285
(58) Field of Classification Search ................ 37/241, 37/270, 285, 225; 294/54.5
See application file for complete search history.

(56) References Cited

U.S. PATENT DOCUMENTS

| | | | | | |
|---|---|---|---|---|---|
| 266,121 | A | * | 10/1882 | Etzler | 172/755 |
| 1,526,903 | A | * | 2/1925 | Connolly | 37/197 |
| 1,747,258 | A | * | 2/1930 | O'Neil | 294/49 |
| 2,598,952 | A | * | 6/1952 | Weingart | 294/54.5 |
| 2,638,730 | A | * | 5/1953 | Davidson | 56/400.14 |
| 3,063,174 | A | * | 11/1962 | Eric | 37/434 |
| 3,078,604 | A | * | 2/1963 | Neuman | 294/54.5 |
| 3,174,477 | A | * | 3/1965 | Wilson | 126/271.2 A |
| 3,365,822 | A | * | 1/1968 | Bryson | 37/283 |
| 3,468,042 | A | * | 9/1969 | Coy | 37/104 |
| 3,619,917 | A | * | 11/1971 | Fischer | 37/266 |
| 3,685,592 | A | * | 8/1972 | Frisbee | 172/811 |
| 4,033,055 | A | * | 7/1977 | Lazarecky | 37/230 |
| 4,068,725 | A | * | 1/1978 | Watson | 172/701.1 |
| 4,070,771 | A | * | 1/1978 | Yakiwchuk | 37/285 |
| 4,104,812 | A | * | 8/1978 | Stribiak, Jr. | 37/243 |
| 4,226,034 | A | * | 10/1980 | Benjamin et al. | 37/229 |

(Continued)

*Primary Examiner*—Thomas A Beach
*Assistant Examiner*—Matthew R Buck
(74) *Attorney, Agent, or Firm*—Schmeiser, Olsen & Watts, LLP

(57) ABSTRACT

A fluid shovel apparatus that pushes and lifts loose material such as snow, leaves, sand, dirt, grass clippings, mulch, or the like. The present invention includes at least one fluid exhaust port extending through a blade. Pressurized fluid is ejected through the at least one fluid exhaust port extending through the blade and ejects towards loose material. The loose material floats on a cushion of pressurized fluid that forms between the blade and the loose material. The loose material is pushed away from the blade and is lifted in an upward direction. Additionally, the fluid shovel apparatus may further include a soft pad and an ice scraper blade to assist in removing material from a surface of a motor vehicle. Additionally, the fluid shovel apparatus may be used to deliver a fire suppressant pressurized fluid upon a material that is burning. Additionally, the fluid shovel apparatus may be used to clear snow from railroad train tracks ahead of a railroad train car.

20 Claims, 9 Drawing Sheets

U.S. PATENT DOCUMENTS

| | | | |
|---|---|---|---|
| 4,274,212 A * | 6/1981 | Kurkela et al. | 37/218 |
| 4,413,371 A * | 11/1983 | Tuggle et al. | 15/405 |
| 4,532,725 A * | 8/1985 | Trejo et al. | 37/243 |
| 4,651,452 A | 3/1987 | Husso | |
| 4,884,314 A * | 12/1989 | Miner et al. | 15/344 |
| 5,054,159 A * | 10/1991 | Richardson | 15/400 |
| 5,058,235 A * | 10/1991 | Charky | 15/340.1 |
| 5,072,486 A * | 12/1991 | Guarascio | 15/401 |
| 5,152,126 A * | 10/1992 | Cousineau | 37/342 |
| 5,170,943 A * | 12/1992 | Artzberger | 239/532 |
| 5,305,585 A * | 4/1994 | Cousineau | 56/8 |
| 5,477,583 A * | 12/1995 | Deloe | 15/236.01 |
| 5,511,327 A * | 4/1996 | Jurkowski et al. | 37/285 |
| 5,522,162 A | 6/1996 | Allison | |
| 5,991,973 A * | 11/1999 | Simpson | 15/402 |
| 6,053,548 A * | 4/2000 | Bowles, Jr. | 294/54.5 |
| 6,155,351 A * | 12/2000 | Breedlove et al. | 169/14 |
| 6,158,152 A * | 12/2000 | Nathenson et al. | 37/347 |
| 6,158,791 A | 12/2000 | Drew | |
| 6,267,183 B1 * | 7/2001 | Smagac | 169/30 |
| 6,494,514 B1 * | 12/2002 | Stinnett et al. | 294/59 |
| 6,601,887 B2 * | 8/2003 | Graves | 294/58 |
| 6,643,958 B1 | 11/2003 | Krejci | |
| 6,688,021 B2 * | 2/2004 | Baig et al. | 37/214 |
| 6,808,332 B1 * | 10/2004 | Demuth et al. | 401/266 |
| 6,944,980 B1 * | 9/2005 | Lefrancois | 37/285 |
| 7,287,926 B2 * | 10/2007 | Demuth et al. | 401/266 |
| 2002/0095824 A1 * | 7/2002 | Johnson | 37/241 |
| 2004/0154125 A1 * | 8/2004 | Houvener | 15/339 |
| 2004/0189029 A1 * | 9/2004 | Harrison et al. | 294/54.5 |

* cited by examiner

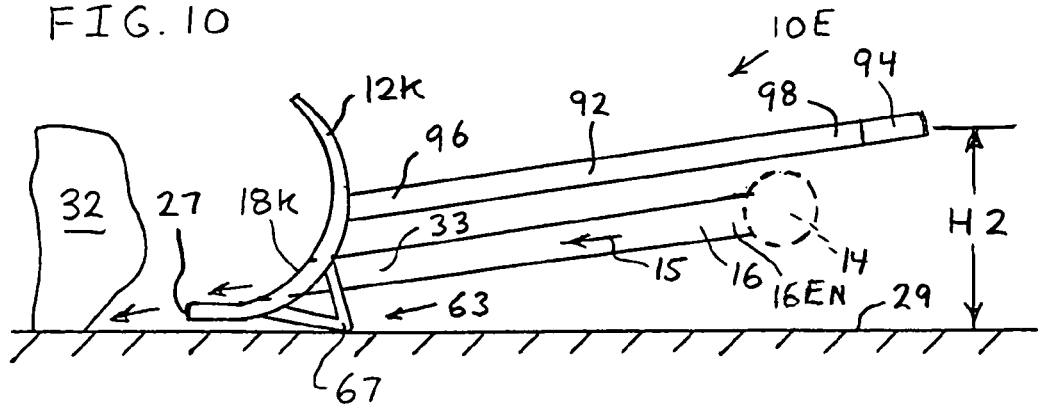
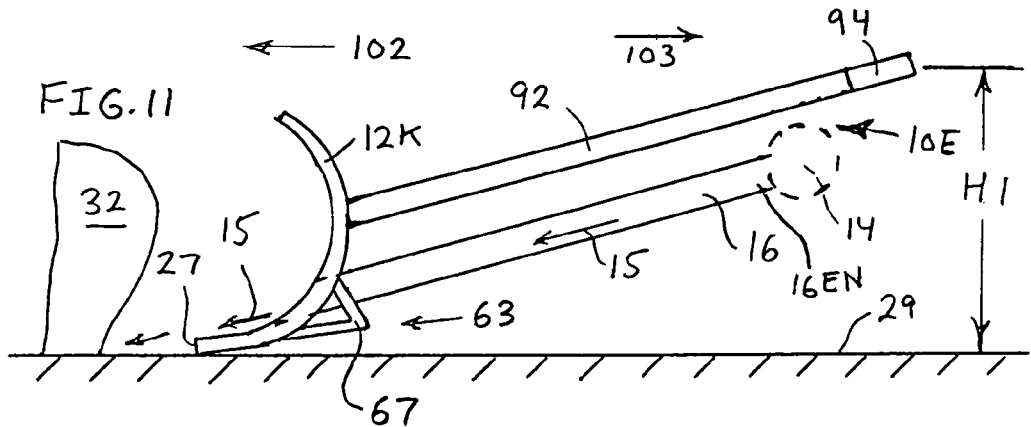
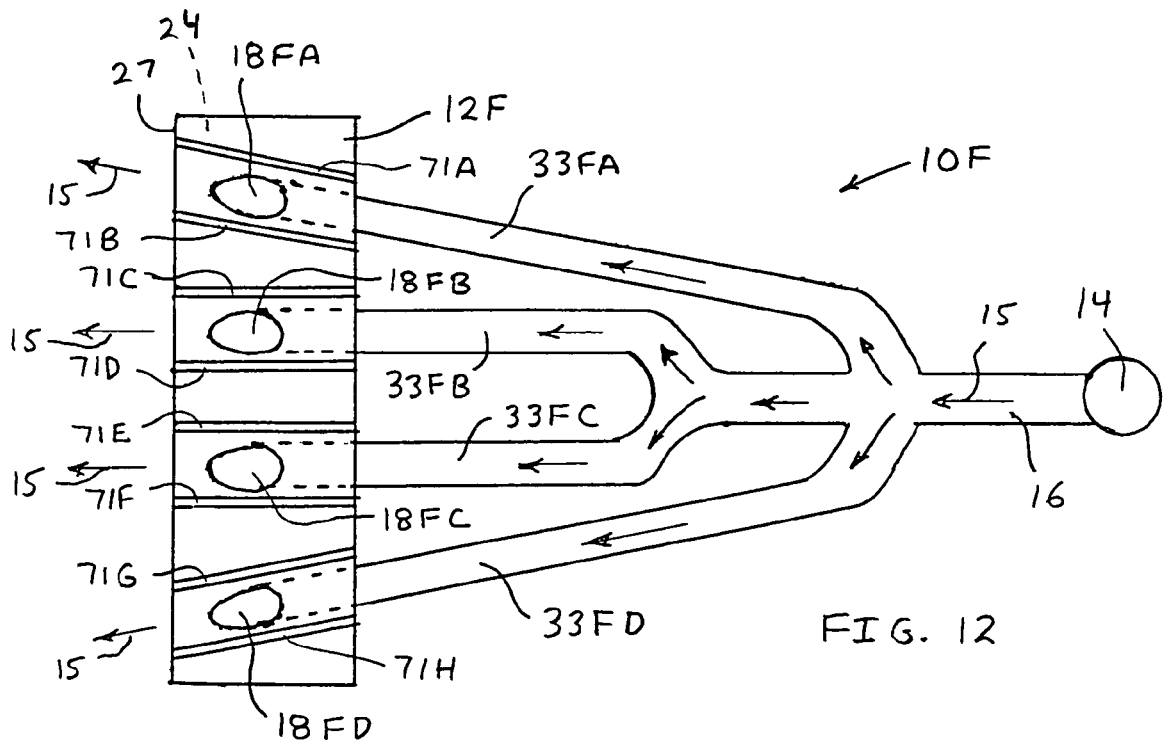

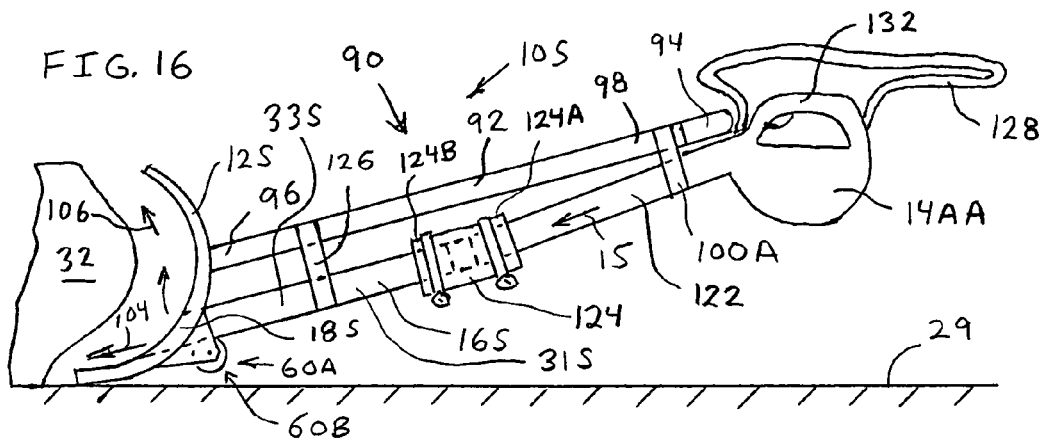
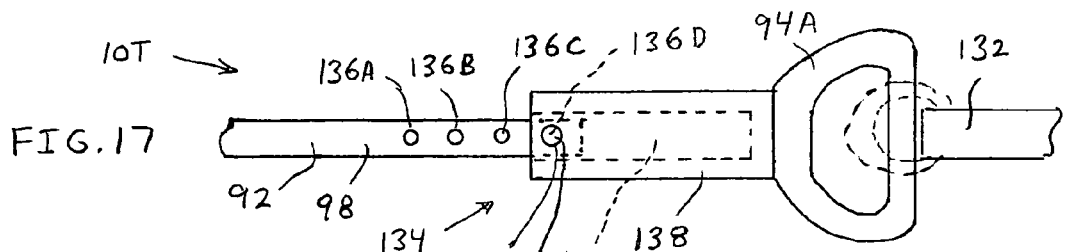
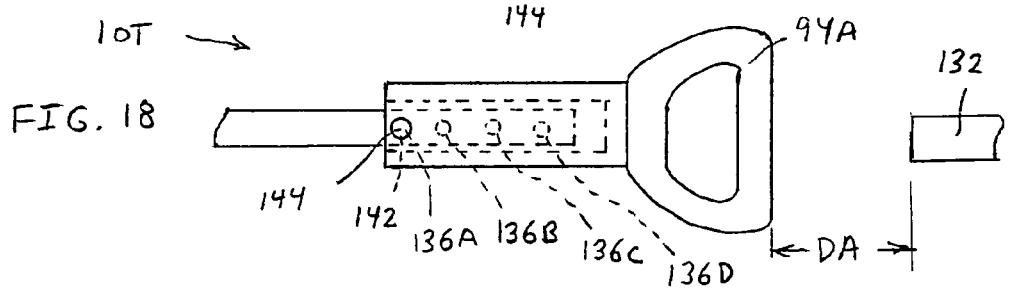
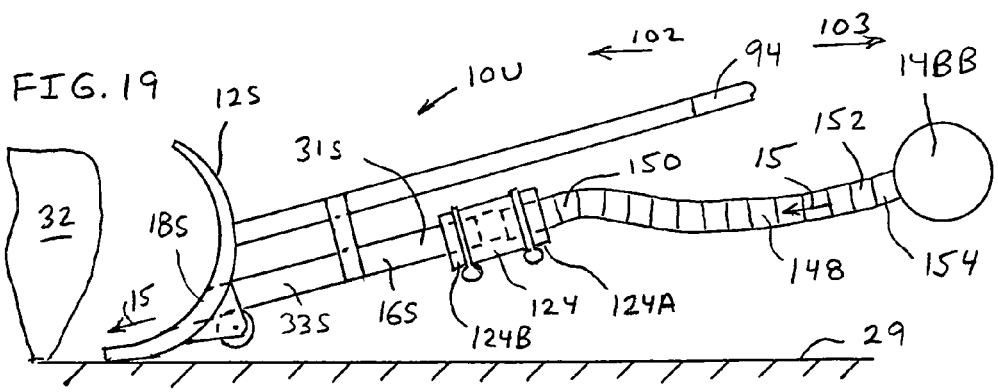

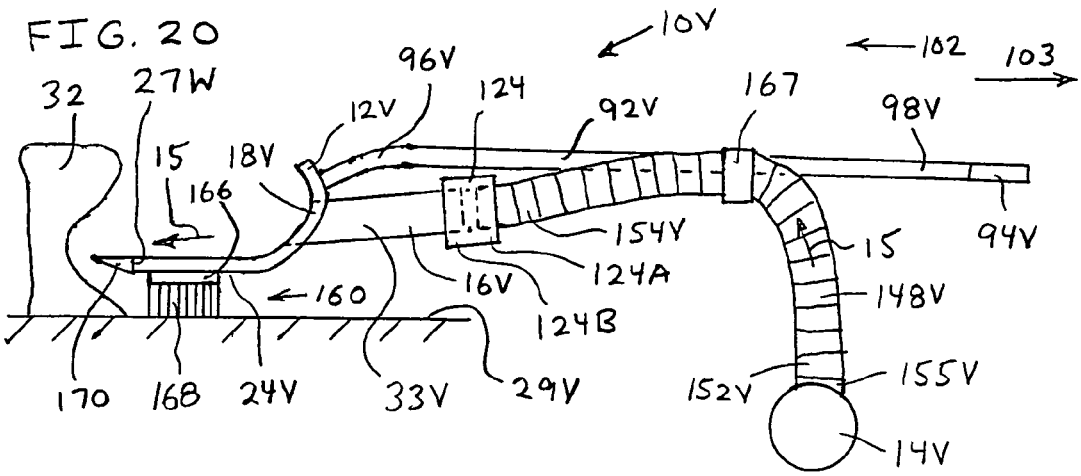
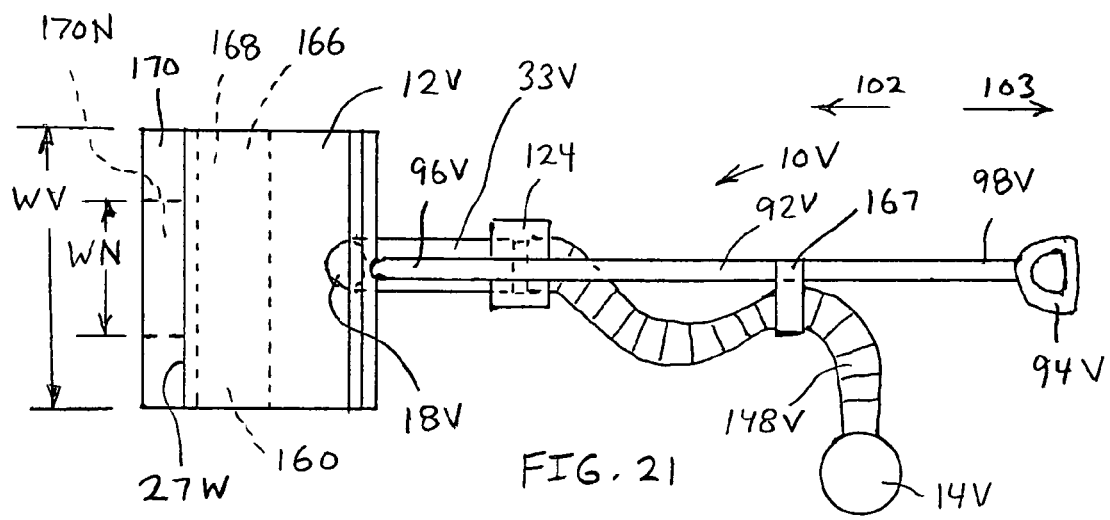
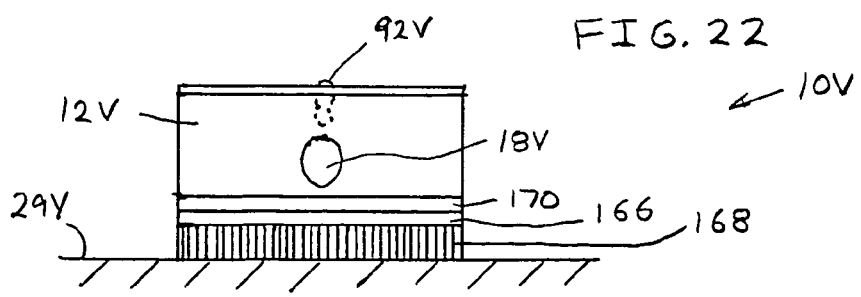

FLUID SHOVEL APPARATUS AND METHOD

The present patent application is a continuation-in-part of copending U.S. patent application Ser. No. 12/069,139, filed Feb. 7, 2008, and entitled "Fluid Shovel Apparatus and Method," which is a continuation-in-part of copending U.S. patent application Ser. No. 11/786,233, filed Apr. 11, 2007 and entitled "Fluid Shovel Apparatus and Method." This invention relates generally to shovels for pushing and lifting loose material such as snow, leaves, sand, dirt, grass clippings, mulch, grain, flour, coal, ash, gravel, etc.

BACKGROUND OF THE INVENTION

Shovels are well known in the art. Typically, shovels have included a blade that comes in direct contact with loose material while pushing the loose material. Additionally, the loose material must also be lifted and tossed to a desired location. This lifting requires significant energy for heavy loose material. Significant frictional force is created between the blade and the loose material as the loose material is pushed or lifted by the shovel. Significant work and effort is required to overcome this frictional force. If the loose material is wet such as snow, wet leaves, wet dirt, or the like, the scraping of the shovel along a support surface does not completely remove the loose material from the support surface. Additionally, the shovel does not remove any remaining moisture from the support surface.

SUMMARY OF THE INVENTION

In order to overcome the above deficiencies, the present invention provides a fluid shovel apparatus for easily pushing and lifting loose material such as snow, leaves, sand, dirt, grass clippings, mulch, grain, flour, or any other suitable material. The present invention provides a fluid shovel apparatus wherein a pressurized fluid is used to push and lift the loose material. At least one fluid exhaust port is located in a blade. The pressurized fluid flows through the blade and ejects out through the at least one fluid exhaust port and is directed towards the loose material. The pressurized fluid pushes the loose material in a direction away from the blade. Additionally, the pressurized fluid flows in an upward direction away from the blade and carries the loose material in an upward direction. Therefore, the fluid shovel apparatus does not have to be physically lifted in an upward direction in order to lift and toss the loose material. Additionally, the pressurized fluid prevents the loose material from coming in contact with the blade. The loose material floats on a cushion of pressurized fluid that forms between the blade and the loose material. This results in an elimination of the friction between the material and the blade. Therefore, much less energy and effort is required to push the loose material. Additionally, the fluid shovel apparatus may further include a brush assembly and an ice scraper blade to assist in removing material from a surface of a motor vehicle. Additionally, the fluid shovel apparatus may be used to deliver a fire suppressant pressurized fluid upon a material that is burning. Additionally, the fluid shovel apparatus may be attached to a train and used to clear snow from train rails.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 10 illustrates a side view of another embodiment of a fluid shovel apparatus, wherein the fluid shovel apparatus includes a skid runner in contact with the support surface while the leading scraper edge of the lower surface of the blade is elevated above the support surface;

FIG. 11 illustrates a side view of the fluid shovel apparatus of FIG. 10 wherein the skid runner is elevated above the support surface while the leading scraper edge of the lower surface of the blade is resting upon the support surface;

FIG. 12 illustrates a plan view of another embodiment of a fluid shovel apparatus, wherein at least one of a straight air jet duct is at an acute angle relative to the leading scraper edge and at least one of the straight air jet duct is perpendicular to the leading scraper edge;

FIG. 16 illustrates a side view of another embodiment of a fluid shovel apparatus, wherein the fluid shovel apparatus is attached to a leaf blower;

FIG. 17 illustrates a plan view of a fluid shovel apparatus, wherein the main propulsion member is adjustable in length to reach the pressure apparatus;

FIG. 18 illustrates a plan view of a fluid shovel apparatus, wherein the main propulsion member is retracted away from the pressure apparatus;

FIG. 19 illustrates a side view of another embodiment of a fluid shovel apparatus, wherein the straight air jet duct is connected with a flexible duct to the pressure apparatus;

FIG. 20 illustrates another embodiment of a fluid shovel apparatus, wherein the blade includes a brush assembly attached to the lower surface of the blade and wherein a ice scraper blade is attached to a protruding leading edge of the blade;

FIG. 21 illustrates a plan view of the fluid shovel apparatus of FIG. 20;

FIG. 22 illustrates a front view of the fluid shovel apparatus of FIG. 20;

DETAILED DESCRIPTION OF THE INVENTION

Figure 1:
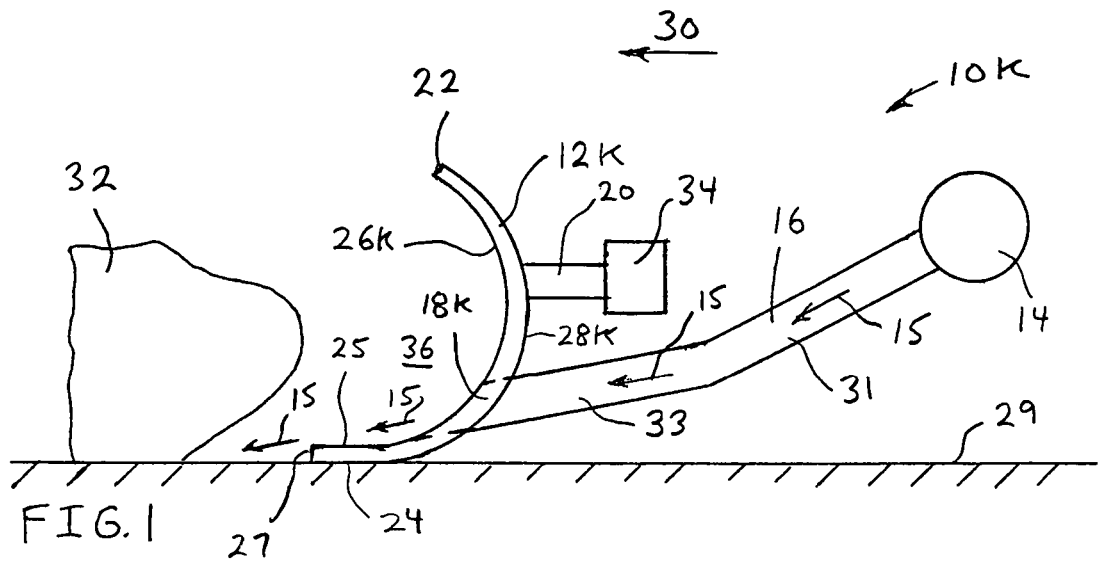
FIG. 1 illustrates a side view of a fluid shovel apparatus according to a preferred embodiment of the present invention.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

Referring to FIG. 1, there is illustrated a side view of a fluid shovel apparatus 10K in accordance with a preferred embodiment of the present invention. The fluid shovel apparatus 10K includes a concave curving blade 12K, a pressure apparatus 14, a pressurized fluid 15, a conduit system 16, at least one fluid exhaust port 18K, and a propulsion member 20. The blade 12K includes an upper surface 22, a lower surface 24, a flat entrance surface 25, a front face 26K, and a rear face 28K. The blade 12K includes a leading scraper edge 27 between the flat entrance surface 25 and the lower surface 24 (FIG. 1). The blade 12K may include any suitable concave curving shape (e.g., circular, oval, elliptical, etc.). The blade 12K may be formed from any suitable material (e.g., plastic, polycarbonate, steel, aluminum, fiber glass, carbon fiber, polypropylene, nylon, fiber reinforced polymer, etc.). The conduit system 16 includes an inlet duct 31 and a straight jet duct 33. The lower surface 24 of the blade 12K may rest upon a support surface 29. The support surface 29 may include any suitable surface such as a paved surface, a sidewalk, a hard packed surface or the like. The pressure apparatus 14 provides the pressurized fluid 15. The pressure apparatus 14 may include any suitable pressure source (e.g., a pump, a fan, a blower, a portable blower, a compressor, etc.). The pressurized fluid 15 may include any suitable fluid (e.g., air, nitrogen, water, etc.). The pressurized fluid 15 flows from the pressure apparatus 14 through the conduit system 16 and through the fluid exhaust port 18K. The fluid exhaust port 18K is an opening through the blade 12K from the rear face 28K to the front face 26K of the blade 12K. Therefore, the pressurized fluid 15 flows through the blade 12K and ejects through the front face 26K of the blade 12K.

The propulsion member 20 is used to move the blade 12K in a forward direction (directional arrow 30) towards a pile of loose material 32. The propulsion member 20 may be attached to or pushed by a propulsion system 34. The propulsion system 34 may include any suitable propulsion system (e.g., a person, a garden tractor, an all terrain vehicle, a lawn mower, a truck, a motorized vehicle, a railroad train, an airport plow truck, etc.). The loose material 32 may include any loose material (e.g., snow, leaves, sand, dirt, grass clippings, mulch, granular material, grain, flour, coal, ash, gravel, etc.). Optionally, the propulsion member 20 may be deleted and the propulsion system 34 may push directly on the conduit system 16 or on the pressure apparatus 14.

As the blade 12K approaches the loose material 32, the pressurized fluid 15 ejecting from the fluid exhaust port 18K pushes the loose material 32 away from the front face 26K of the blade 12K. As the blade 12K moves closer to the loose material 32 a region 36 of pressurized fluid 15 is formed between the front face 26 of the blade 12 and the loose material 32. This region 36 of pressurized fluid 15 prevents the loose material 32 from coming in contact with the front face 26 of the blade 12. The loose material 32 floats on a cushion of pressurized fluid 15 that forms between the front face 26K of the blade 12K and the loose material 32. This results in elimination of friction between the loose material 32 and the front face 26K of the blade 12K. Therefore, much less energy and effort is required to push the loose material 12 in the forward direction (directional arrow 30). Additionally, the pressurized fluid 15 strongly pushes the loose material 32 in a forward direction (directional arrow 30). When the loose material 32 is snow and the pressurized fluid 15 is air, the pressurized fluid 15 pulverizes the snow into small dry flakes 39. Additionally, when the pressurized fluid 15 is air, the pressurized fluid 15 strikes the support surface 29 and cleans and dries the support surface 29.

Figure 2:
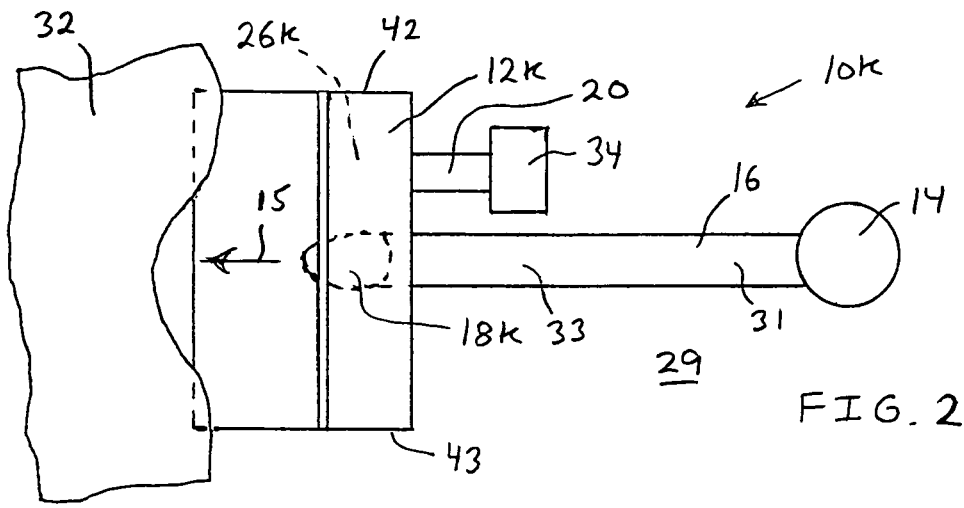
FIG. 2 illustrates a plan view of the fluid shovel apparatus of FIG. 1.

FIG. 2 illustrates a plan view of the fluid shovel apparatus 10K of FIG. 1. The blade 12K includes a right face 42 and a left face 43. The pressurized fluid 15 ejecting from the fluid exhaust port 18K pushes the loose material 32 away from the front face 26K of the blade 12K.

Figure 3:
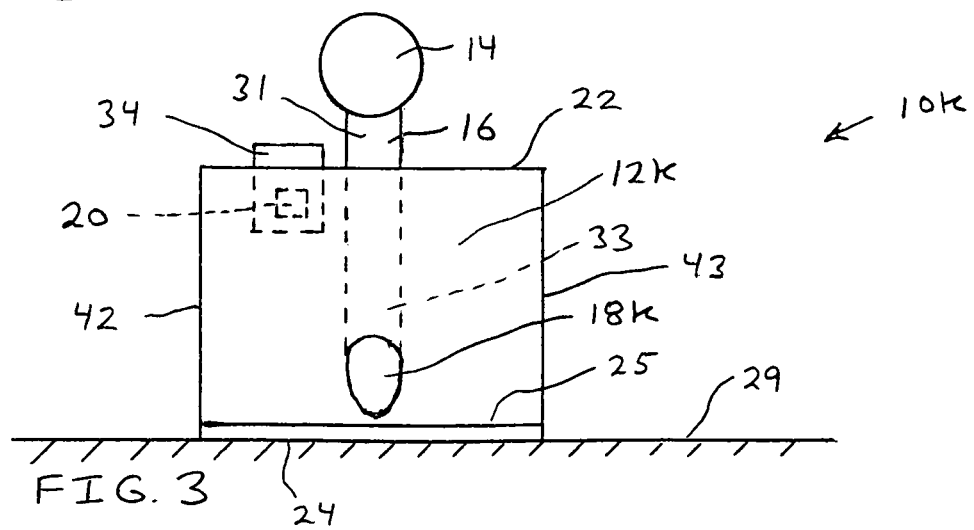
FIG. 3 illustrates a front view of the fluid shovel apparatus of FIG. 1.

FIG. 3 illustrates a front view of the fluid shovel apparatus 10K of FIG. 1. The pressurized fluid 15 flows from the pressure apparatus 14, through the conduit system 16 and through the fluid exhaust port 18K. The fluid exhaust port 18K is an opening through the blade 12K. The fluid exhaust port 18K shape is formed by the intersection of the straight jet duct 33 and the blade 12K. The fluid exhaust port 18K may be adjacent to the lower surface 24 of the blade 12K. In this position, the pressurized fluid 15 flowing from the fluid exhaust port 18K very effectively sweeps the loose material 32 away from the flat entrance surface 25 of the blade 12K and from the support surface 29. Additionally, if the loose material 32 is wet and the pressurized fluid 15 is a gas (e.g. air, nitrogen, carbon dioxide, etc.) the pressurized fluid 15 removes moisture from the support surface 29.

Figure 4:
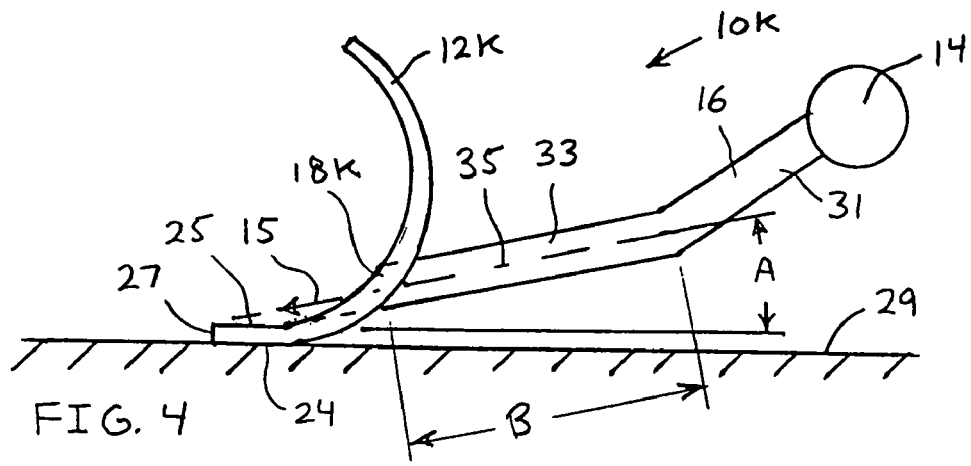
FIG. 4 illustrates a side view of the fluid shovel apparatus of FIG. 1, wherein a lower surface of a blade of the fluid shovel apparatus is resting upon a support surface.

FIG. 4 illustrates a side view of the fluid shovel apparatus 10K, wherein the lower surface 24 of the blade 12K is resting upon the support surface 29. The conduit system 16 includes the inlet duct 31 and the straight jet duct 33. A centerline 35 of the straight jet duct 33 may intersect with the leading scraper edge 27 of the blade 12K. An angle (A) between the flat entrance surface 25 and the centerline 35 of the straight jet duct 33 may typically lie between about 10 and about 20 degrees. If the straight jet duct 33 is circular in cross section, the length "B" of the straight jet duct is typically at least about 3 times a diameter of the straight jet duct 33. The straight jet duct 33 may preferably be at least about 4.5 cm in diameter. The pressurized fluid 15 flows through the straight jet duct 33 and through the fluid exhaust port 18K in the blade 12K. The pressurized fluid sweeps across the flat entrance surface 25 of the blade 12K and also over the leading scraper edge 27 and onto the support surface 29. The straight jet duct 33 is not limited to being circular in cross section. The straight jet duct 33 cross section may be any suitable cross section (e.g., circular, oval, oblong, elliptical, rounded, square, rectangular, etc.). The shape of the fluid exhaust port 18K is formed by the intersection of the straight jet duct 33 with the blade 12K. In FIG. 4, the propulsion system 34 (not shown) may push and pull directly on the conduit system 16 or the pressure apparatus 14.

Optionally, the fluid shovel apparatus 10K may include the curving blade 12k, the conduit system 16 and at least one fluid exhaust port 18K.

Figure 5:
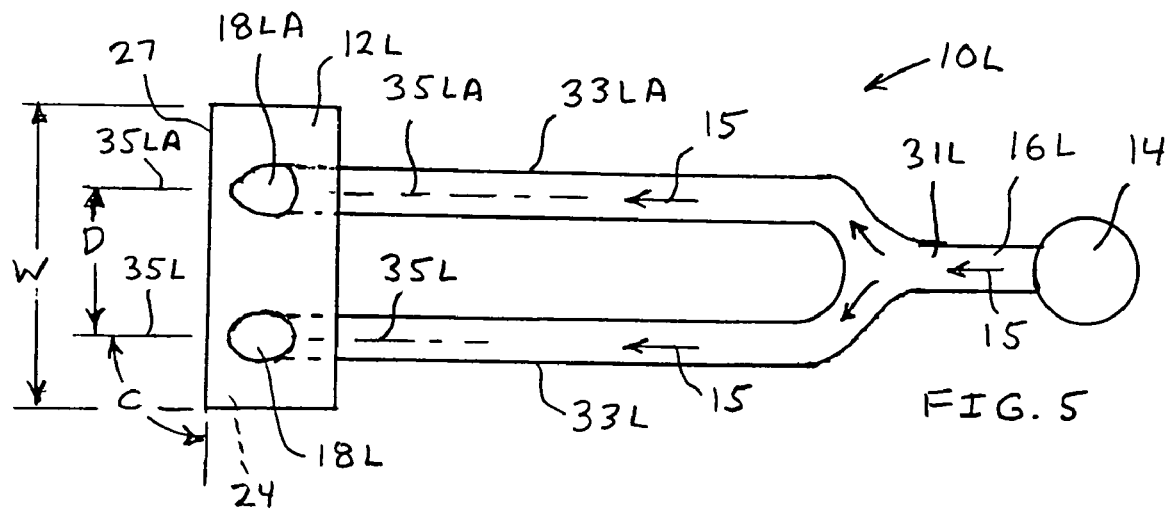
FIG. 5 illustrates a plan view of another embodiment of a fluid shovel apparatus, wherein the fluid shovel apparatus includes two fluid exhaust ports in the blade.

FIG. 5 illustrates a plan view of another embodiment of a fluid shovel apparatus 10L. The fluid shovel apparatus 10L includes a blade 12L, a fluid exhaust port 18L, a fluid exhaust port 18LA, a pressure apparatus 14 and a conduit system 16L. The conduit system 16L includes an inlet duct 31L, a straight jet duct 33L and a straight duct 33LA. The pressurized fluid 15 flows from the pressure apparatus 14 through the inlet duct 31L, through the straight jet duct 33L, and through the straight duct 33LA. The pressurized fluid 15 flows through the straight jet duct 33L and through the fluid exhaust port 18L in the blade 12L. Additionally, the pressurized fluid 15 flows through the straight jet duct 33LA and through the fluid exhaust port 18LA in the blade 12L.

An angle (C) measured between a centerline 35L of the straight jet duct 33L and the leading scraper edge 27 may lie between about 70 degrees and 90 degrees. The angle (C) is 90 degrees as shown in FIG. 5. A centerline 35LA of the straight jet duct 33LA is shown in FIG. 5. A spacing "D" between the centerline 35L and the centerline 35LA may preferably be about 20 to about 26 cm when the straight jet ducts 33L and 33LA include diameters of about 5 cm.

Optionally, additional fluid exhaust ports 18 may be added through the blade 12L at any suitable location to blow loose material away from the blade. These additional fluid exhaust ports 18 are not limited to being located adjacent to the lower surface 24 of the blade 12L.

Figure 6:
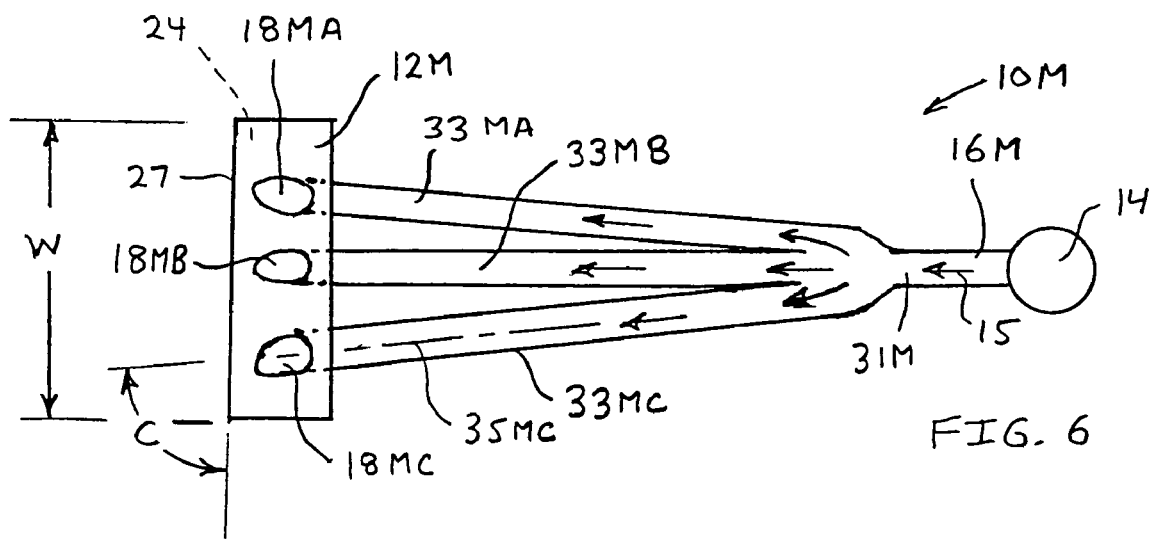
FIG. 6 illustrates a plan view of another embodiment of a fluid shovel apparatus, wherein the fluid shovel apparatus includes three fluid exhaust ports in the blade.

FIG. 6 illustrates a plan view of another embodiment of a fluid shovel apparatus 10M. The fluid shovel apparatus 10M includes a blade 12M, a fluid exhaust port 18MA, a fluid exhaust port 18MB, a fluid exhaust port 18 MC, a pressure apparatus 14 and a conduit system 16M. The conduit system 16M includes an inlet duct 31M, a straight jet duct 33MA, a straight jet duct 33MB and a straight jet duct 33MC. The pressurized fluid 15 flows from the pressure apparatus 14 through the inlet duct 31M through the straight jet duct 33MA, through the straight jet duct 33MB and through the straight duct 33MC. The pressurized fluid 15 flows through the straight jet duct 33MA and through the fluid exhaust port 18MA in the blade 12M. The pressurized fluid 15 flows through the straight jet duct 33MB and through the fluid exhaust port 18MB in the blade 12M. The pressurized fluid 15 flows through the straight jet duct 33MC and through the fluid exhaust port 18MC in the blade 12M.

The angle (C) measured between a centerline 35MC of the straight jet duct 33MC and the leading scraper edge 27 may preferably lie between about 70 degrees and 90 degrees. As shown in FIG. 6, the angle (C) is an acute angle less than 90 degrees.

As shown in FIGS. 5 and 6 a width "W" of the blade 12L and 12M may preferably be between about 50 cm and about 60 cm in width when the blades 12L and 12M include about 2 to 3 fluid exhaust ports 18 and when the pressure apparatus 14 is a typical leaf blower. For pressure apparatus 14 with higher capacities than a typical leaf blower, then the width "W" of the blade may be any dimension larger than about 50 cm. If a fluid shovel apparatus as illustrated in FIG. 2 includes one fluid exhaust port 18K, then the width "W" of the blade may preferably be at least about 18 cm.

Optionally, additional fluid exhaust ports 18 may be added through the blade 12M at any suitable location to blow loose material away from the blade. These additional fluid exhaust ports 18 are not limited to being located adjacent to the lower surface 24 of the blade 12M.

Figure 7:
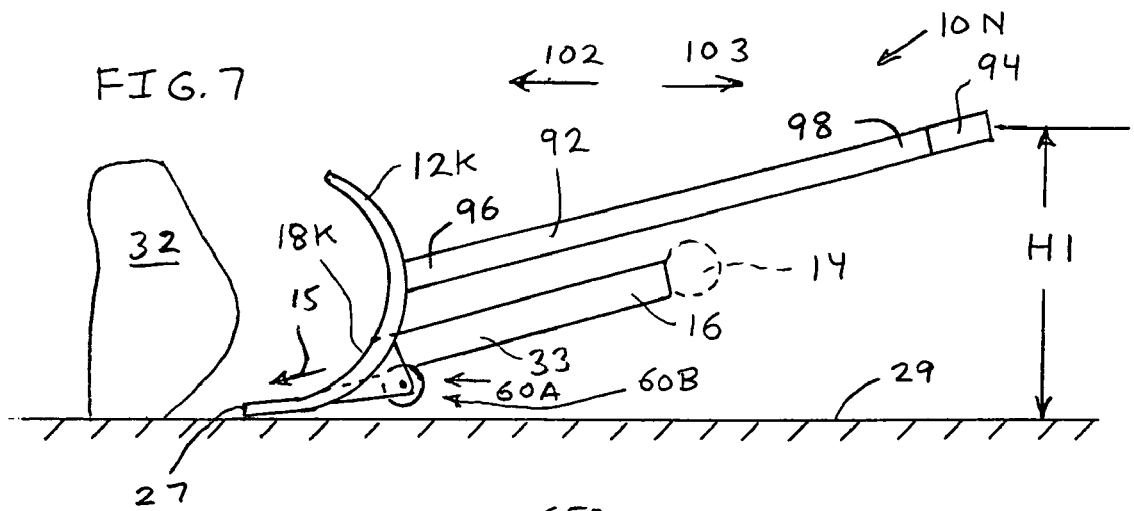
FIG. 7 illustrates a side view of another embodiment of a fluid shovel apparatus in accordance with the present invention, wherein the fluid shovel apparatus includes wheel assemblies for rolling the blade along the support surface and wherein a leading scraper edge of the lower surface of the blade is resting upon the support surface while the wheel assemblies are elevated above the support surface.
Figure 8:
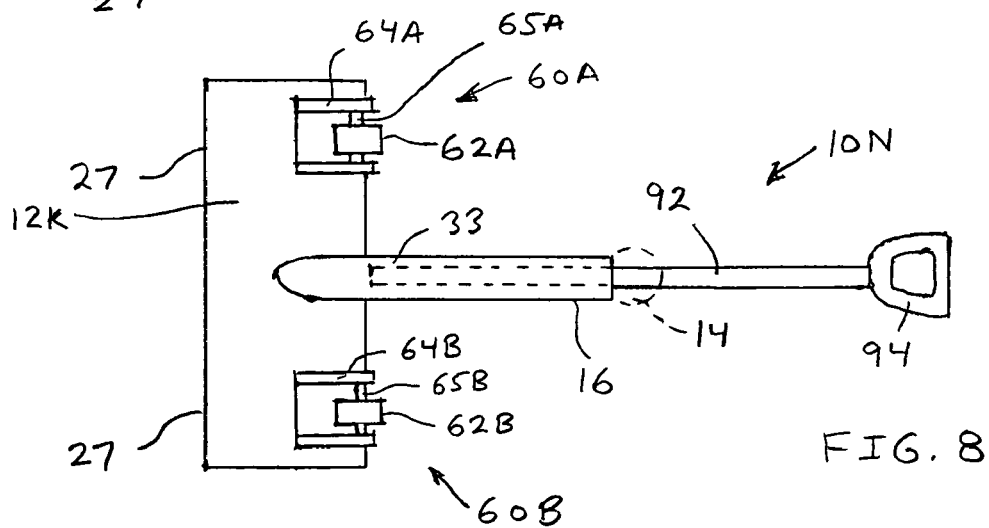
FIG. 8 illustrates a bottom view of the fluid shovel apparatus of FIG. 7 including two wheel assemblies.

FIGS. 7 and 8 illustrate another embodiment of a fluid shovel apparatus 10N, wherein the fluid shovel apparatus 10N includes a wheel assembly 60A and a wheel assembly 60B for rolling a blade 12K along a support surface 29. The fluid shovel apparatus 10N includes a shaft 92 and a handle 94. A first end 96 of the shaft 92 is attached to the blade 12K. The handle 94 is attached to a second end 98 of the shaft 92. An operator may grip the handle 94 and push or pull the blade 12K of the shovel 10N in a forward direction (direction arrow 102) or a backward direction (direction arrow 103) towards or away from the pile of loose material 32. The pressurized fluid 15 flows from the pressure apparatus 14 through the conduit system 16 and through the fluid exhaust port 18K.

The wheel assembly 60A includes a wheel 62A and a wheel bracket 64A. The wheel bracket 64A includes an axel 65A. The wheel 62A is rotatably attached to the bracket 64A and rotates about the axel 65A. The wheel 62A is mounted in a fixed direction perpendicular to the leading scraper edge 27 of the blade 12K. The wheel assembly 60B includes a wheel 62B and a wheel bracket 64B. The wheel bracket 64B includes an axel 65B. The wheel 62B is rotatably attached to the bracket 64B and rotates about the axel 65B. The wheel 62B is mounted in a fixed direction perpendicular to the leading scraper edge 27 of the blade 12K. The wheel brackets 62A and 62B are rigidly attached to the blade 12K. The wheel brackets 64A and 64B may be attached to the blade 12K using any suitable method (e.g., glue, bolts, welding, etc.). The wheels 62A and 62B may include any suitable material (e.g., rubber, plastic, metal, etc.).

As illustrated in FIG. 7 the leading scraper edge 27 is in contact with the support surface 29 when the handle 94 of the shovel is at a first height "H1" above the support surface 29. The wheel assemblies 60A and 60B are raised above the support surface and the wheels 62A and 62B are not in contact with the support surface 29. The operator may grasp the handle 94 and may push or pull the blade 12K in a forward direction (direction arrow 102) or in a backward direction (direction arrow 103) while the leading scraper edge 27 is in contact with the support surface 29. The first height "H1" may be any suitable height for an operator. The height "H1" may preferably be between about 66 cm and about 74 cm above the support surface 29 for an operator with an average height. The height "H1" may be lower or higher to suit an operator that is shorter or taller than the height of the average operator.

Figure 9:
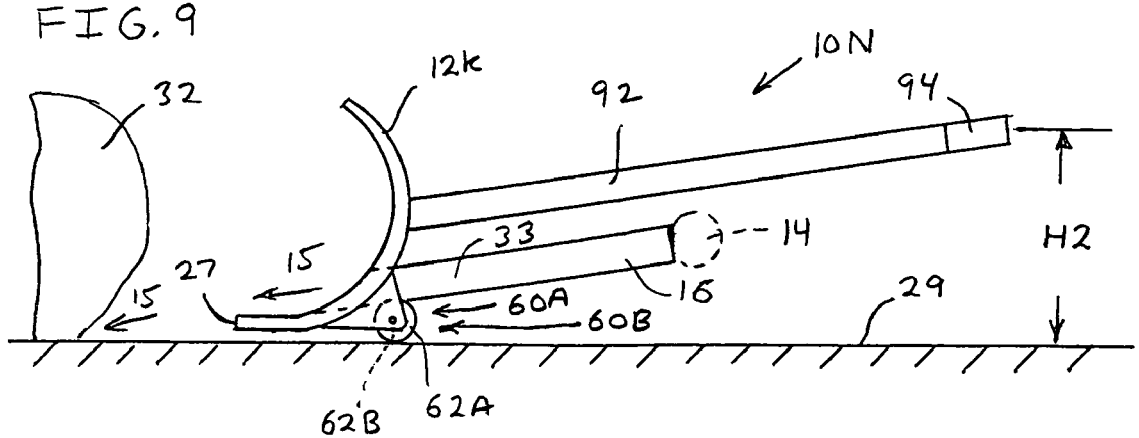
FIG. 9 illustrates a side view of the fluid shovel apparatus of FIG. 7, wherein the wheel assemblies are in contact with the support surface and the leading scraper edge of the lower surface of the blade is elevated above the support surface.

As illustrated in FIG. 9 the leading scraper edge 27 is lifted above the support surface and the wheels 62A and 62B are in contact with the support surface 29 when the handle 94 of the fluid shovel apparatus 10N is at a second height "H2" above the support surface 29. The wheels 62A and 62B roll along the support surface 29. The blade 12K of the fluid shovel apparatus 10N may be rolled in the forward direction (directional arrow 102) towards the pile of loose material 32. The wheels 62A and 62B may roll over bumps or dips in the support surface. The loose material 32 may include any loose material such as snow, leaves, sand, dirt, grass clippings, mulch, granular material, grain, flour, or the like. The blade 12K of the fluid shovel apparatus 10N may also be rolled in the backward direction (direction arrow 103) away from the loose material 32. As the fluid shovel blade 12K is rolled in the backward direction 103 the pressurized fluid 15 may continue to blow off and remove remaining loose material 32 on the support surface 29.

The height H2 may be any suitable height that is less than the height H1. Thus, when an operator lifts the handle 94 of the fluid shovel 10K to the first height "H1", the leading scraper edge 27 contacts the support surface 29 and when the operator lowers the handle 94 to a second height "H2", the leading scraper edge 27 is lifted above the support surface 29 and the wheels 62A and 62B contact and roll upon the support surface 29.

FIGS. 10 and 11 illustrate a side view of another embodiment of a fluid shovel apparatus 10E. The fluid shovel apparatus 10E includes at least one low friction support assembly 63 attached to the blade 12K of the fluid shovel apparatus 10E. The fluid shovel apparatus 10E includes the shaft 92 and the handle 94. The first end 96 of the shaft 92 is attached to the blade 12K. The handle 94 is attached to the second end 98 of the shaft 92. The operator may grip the handle 94 and push or pull the blade 12K of the shovel 10E in the forward direction (direction arrow 102) or in the backward direction (direction arrow 103) towards or away from a pile of loose material 32. The low friction support assembly 63 may include at least one skid runner 67. The at least one skid runner 67 may include any suitable means (e.g. metal skid, plastic skid, etc.) of providing a low friction contact support of the blade 12K on the support surface 29. The at least one skid runner 67 may be attached to the blade 12K using any suitable means (e.g. welding, gluing, bolting, etc.).

As illustrated in FIG. 11 the leading scraper edge 27 is in contact with the support surface 29 when the handle 94 of the fluid shovel apparatus 10E is at the first height "H1" above the support surface 29. The at least one skid runner 67 is raised above the support surface 29 and the leading scraper edge 27 of the blade 12K is in contact with the support surface 29.

As illustrated in FIG. 10 the leading scraper edge 27 of the blade 12K is raised above the support surface 29 and the at least one skid runner 67 is in contact with the support surface 29 when the shovel handle 94 is at the second height "H2" above the support surface 29.

Optionally, the fluid shovel apparatus 10N (FIGS. 7-9) and the fluid shovel apparatus 10E (FIGS. 10 and 11) may delete the shaft 92 and the handle 94. If the shaft 92 and the handle 94 are deleted, then the pressure apparatus 14 or an end portion 16EN (FIG. 11) of the conduit system 16 is configured to be located at the same position as the previously described handle 94. The operator would then grasp the pressure apparatus 14 or the end portion 16EN of the conduit system 16 and position the pressure apparatus 14 or the end portion 16EN of the conduit system 16 at the distance H1 or H2 above the support surface 29.

FIG. 12 illustrates another embodiment of a fluid shovel apparatus 10F. The fluid shovel apparatus 10F includes a blade 12F. The blade 12F includes stiffener ribs 71A-71H. The stiffener ribs 71A-71H provide additional stiffness and rigidity to the blade 12F. The fluid shovel apparatus 10F includes the pressure apparatus 14, the conduit system 16 and straight jet ducts 33FA, 33FB, 33FC and 33FD. The blade 12F includes fluid exhaust ports 18FA, 18FB, 18FC and 18FD. The pressurized fluid 15 flows from the pressure apparatus 14 through the conduit system 16 through the straight jet ducts 33FA-33FD and through the fluid exhaust ports 18FA-18FD. Each fluid exhaust port 18FA, 18FB, 18FC and 18FD may be located between a pair of stiffener ribs 71. For example, the fluid exhaust port 18FA lies between the stiffener ribs 71A and 71B. The fluid exhaust port 18FB lies between the stiffener ribs 71C and 71D. The fluid exhaust port 18FC lies between the stiffener ribs 71E and 71F. The fluid exhaust port 18FD lies between the stiffener ribs 71G and 71H. Each straight jet duct 33FA-33FD may be parallel to stiffener ribs 71. For example, the straight jet duct 33FA may lie parallel to the stiffener ribs 71A and 71B. The straight jet duct 33FB may lie parallel to the stiffener ribs 71C and 71D. The straight jet duct 33FC may lie parallel to the stiffener ribs 71E and 71F and the straight jet duct 33FD may lie parallel to the stiffener ribs 71G and 71H. The stiffener ribs 71 may be perpendicular to the leading scraper edge 27 or may at an acute angle with respect to the leading scraper edge 27. Thus, the pressurized fluid 15 flow ejecting from the each fluid exhaust port 18 may be directed perpendicular to or at an acute angle to the leading scraper edge 27.

Optionally, additional fluid exhaust ports 18 may be added through the blade 12F at any suitable location to blow loose material away from the blade. These additional fluid exhaust ports 18 are not limited to being located adjacent to the lower surface 24 of the blade 12F.

Figure 13:
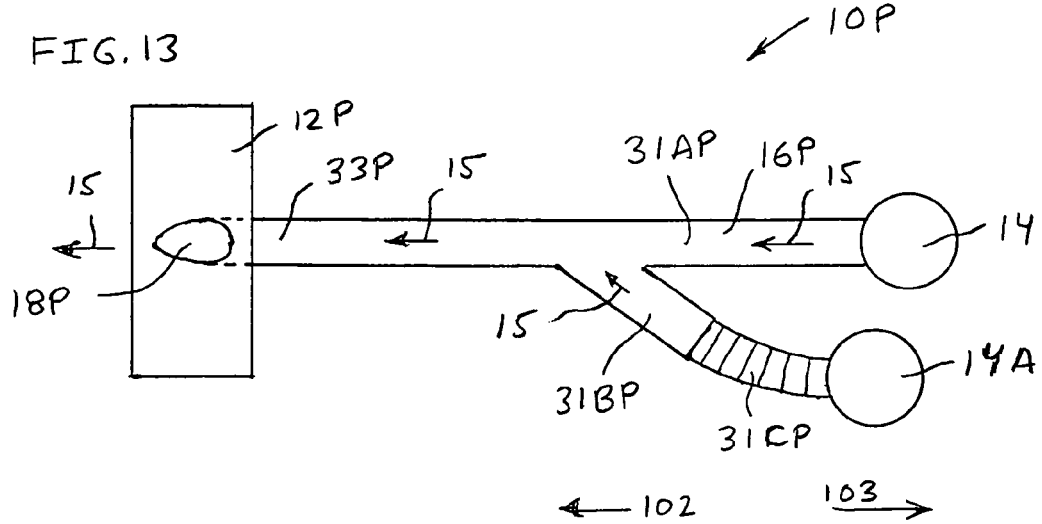
FIG. 13 illustrates a plan view of another embodiment of a fluid shovel apparatus, wherein the pressure apparatus includes a plurality of pressure apparatus.

FIG. 13 illustrates a plan view of another embodiment of a fluid shovel apparatus 10P. The fluid shovel apparatus 10P includes a conduit system 16P, a blade 12P and a fluid exhaust port 18P. The conduit system 16P includes an inlet duct 31AP, an inlet duct 31BP and a straight jet duct 33P. Pressurized fluid 15 flows through the straight jet duct 33P and out through the fluid exhaust port 18P in the blade 12P. The pressure apparatus 14 supplies pressurized fluid 15 to the conduit system 16P. Additional pressure apparatus such as 14A my supply pressurized fluid 15 to the conduit system 16P. The pressure apparatus 14 supplies pressurized fluid to the conduit system 16P through the inlet duct 31AP. The pressure apparatus 14 may be any suitable pressure source (e.g. a pump, a blower, a fan, a portable blower, a backpack blower, etc.). The pressure apparatus 14A supplies pressurized fluid 15 into the conduit system 16P through an inlet duct 31CP and through the inlet duct 31BP. The inlet duct 31CP may be a flexible duct. The pressure apparatus 14A may be any suitable pressure source (e.g., a pump, a blower, a fan, a portable blower, a backpack blower, etc.). Any number of suitable pressure apparatus 14 may simultaneously supply pressurized fluid 15 to the conduit system 16P.

Figure 14:
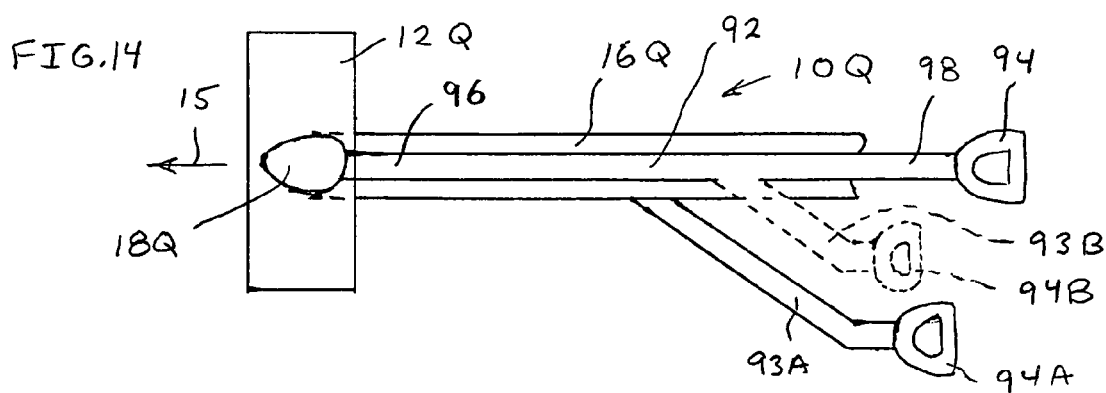
FIG. 14 illustrates a plan view of another embodiment of the fluid shovel apparatus wherein a propulsion member includes a side mounted member to assist an operator in guiding the fluid shovel apparatus.

FIG. 14 illustrates a plan view of another embodiment of a fluid shovel apparatus 10Q. The fluid shovel apparatus 10Q includes a blade 12Q, a conduit system 16Q, the shaft 92, the handle 94. The first end 96 of the shaft 92 is attached to the blade 12Q. The handle 94 is attached to the second end 98 of the shaft 92. Pressurized fluid 15 flows through the conduit system 16Q and through a fluid exhaust port 18Q in the blade 12Q. The operator may grip the handle 94 and push the blade 12Q in a forward direction (direction arrow 102). The operator may grip the handle 94 and pull the blade 12Q in a backward direction (direction arrow 103). A side mounted member 93A may be attached to the conduit system 16Q. The side mounted member 93A may include a handle 94A. The operator may grasp the handle 94 with one hand and may grasp the handle 94A with another hand while moving the blade 12Q of the fluid shovel apparatus 10Q. Optionally, a side mounted member 93B may be attached to the shaft 92. The side mounted member 94B may include a handle 94B. The operator may grasp the handle 94 with one hand and may grasp the handle 94B with another hand while moving the blade 12Q of the fluid shovel apparatus 10Q.

Figure 15:
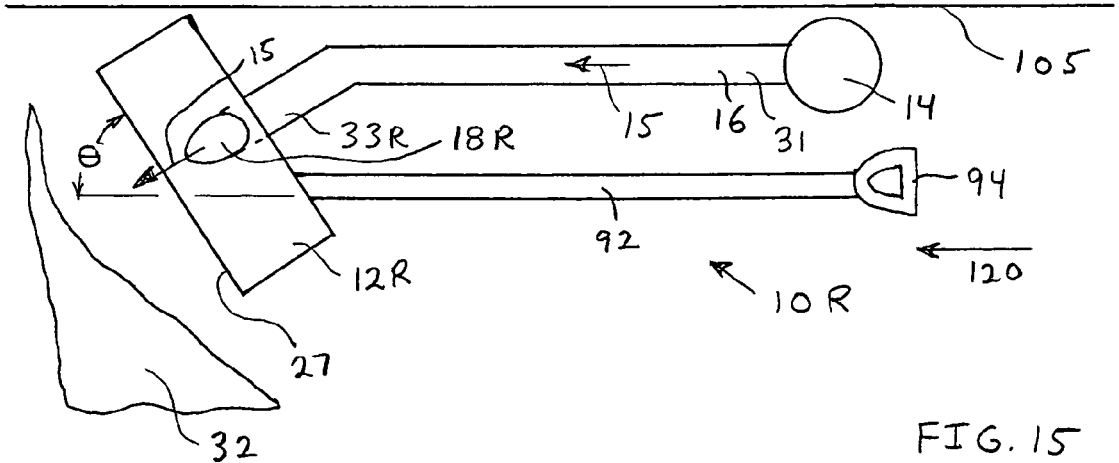
FIG. 15 illustrates a plan view of another embodiment of a fluid shovel apparatus, wherein the blade is at a yaw angle with respect to the main propulsion member.

FIG. 15 illustrates a plan view of another embodiment of a fluid shovel apparatus 10R. The fluid shovel apparatus 10R includes a blade 12R, the shaft 92, the handle 94, the pressure apparatus 14, the conduit system 16 and a fluid exhaust port 18R. The pressurized fluid 15 flows from the pressure apparatus 14 through the inlet duct 31, through the straight jet duct 33R and through the exhaust port 18R in the blade 12R. The Pressurized fluid 15 flows outward from the exhaust port 18R in a direction perpendicular to the leading scraper edge 27 of the blade 12R. The pressurized fluid 15 blows the loose material 32 away from a wall 105.

As illustrated in FIG. 15, the shaft 92 is attached to the blade 12R with a yaw angle (θ) as measured between the shaft 92 and the leading scraper edge of the blade 12R. The angle (θ) may be an acute angle between about 20 and about 45 degrees. The operator may grasp the handle 94 and may push the shaft 92 and the blade 12R in a direction (direction arrow 120) parallel to the wall 105. The pressurized fluid ejecting from the fluid exhaust port 18R blows the loose material 32 away from the wall 105. Optionally, the fluid shovel apparatus 10R may delete the shaft 92 and the handle 94 and the operator may then grasp the inlet duct 31 of the conduit system 16 or the pressure apparatus 14 to push the blade 12R.

FIG. 16 illustrates a side view of another embodiment of the fluid shovel apparatus 10S. The fluid shovel apparatus 10S includes a pressure apparatus 14AA, a conduit system 16S, the pressurized fluid 15, a fluid exhaust port 18S and a shovel apparatus 90. The shovel apparatus 90 is similar to what is commonly used as a "snow shovel", except for modifications including the at least one fluid exhaust port 18S. The shovel apparatus 90 includes a concave curving blade 12S, the shaft 92 and the handle 94. The first end 96 of the shaft 92 is attached to the concave curving blade 12S. The second end 98 of the shaft 92 is attached to the handle 94. The blade 12S may include any suitable material (e.g., plastic, polypropylene, polycarbonate, steel, aluminum, etc.). The pressure apparatus 14AA may include any suitable pressure source (e.g., a blower, a fan, a portable electric blower, a portable gasoline engine powered blower, a backpack blower, etc.). The pressure apparatus 14AA may include a blower outlet duct 122. The conduit system 16S includes an inlet duct 31S and a straight jet duct 33S. The conduit system 16S may be made from any suitable material, (e.g., PVC, modeled plastic, metal, etc.). The straight jet duct 33S may be attached to the blade with any suitable fastening means (e.g., hot glue, epoxy, welding, bolting, etc.). A removable flexible coupling 124 connects the blower outlet duct 122 with the inlet duct 31S. A first end 124A of the removable flexible coupling 124 is removably clamped onto the pressure apparatus 14AA outlet duct 122. A second end 124B of the removable flexible coupling 124 is removably clamped onto the inlet duct 31S. The removable flexible coupling 124 may include any suitable removable coupling (e.g., rubber, plastic, etc.). When installed the removable flexible coupling 124 provides a leak tight joint between the pressure apparatus 14AA blower outlet duct 122 and the inlet duct 31S. The pressurized fluid 15 flows from the blower outlet duct 122, through the inlet duct 31S, through the straight jet duct 33S and through the fluid exhaust port 18S. The pressurized fluid 15 may include any suitable fluid (e.g., air, nitrogen, carbon dioxide, etc.). The pressurized fluid 15 ejects towards a pile of loose material 32. As the blade 12S approaches the pile of loose material 32 the pressurized fluid 15 pushes under the loose material in a downward direction (directional arrow 104). Fluid pressure builds up between the blade 12S and the pile of loose material and pressurized fluid 15 also flows upward in an upward flow direction (directional arrow 106) between the loose material and the blade 12S. A removable coupling clamp 100A may removably clamp the pressure apparatus 14AA to the handle 94 of the shovel apparatus 90. Alternatively, the removable coupling clamp 100A may removably clamp the pressure apparatus 14A to the second end 98 of the shaft 92 of the shovel apparatus 90. The removable coupling clamp 100A may include any suitable clamping device (e.g. rubber shock cord, rope, plastic clamp, etc.). Additionally, the removable coupling clamp 100A may removably clamp onto a blower handle 132 of the pressure apparatus 14AA. The blower handle 132 of the pressure apparatus 14A provides a means for the operator to hold onto and move the pressure apparatus 14AA.

A clamping device 126 may be used to clamp the shaft 92 to the conduit system 16S. The clamping device 126 rigidly clamps the shaft 92 with the conduit system 16S. Wheel assemblies 60A and 60B as shown in FIGS. 7 and 8 and described in a previous section of this specification may be attached to the blade 12R.

A shoulder strap 128 may be removably attached to the pressure apparatus 14AA. The operator may place the shoulder strap 128 over one shoulder to help support some of the weight of the pressure apparatus 14AA.

FIG. 17 illustrates a plan view of another embodiment of a fluid shovel apparatus 10T including a shaft extension apparatus 134. The shaft extension apparatus 134 includes a plurality of holes 136A, 136B, 136C and 136D in the second end 98 of the shaft 92. Additionally, the shaft extension apparatus 134 includes a sleeve 138 and a handle 94A. The handle 94A is rigidly attached to the sleeve 138. The sleeve 138 includes a chamber 140. The second end 98 of the shaft 92 slides into the chamber 140 of the sleeve 138. The sleeve 138 includes a sleeve hole 142 that passes through the sleeve 138. A removable pin 144 may pass through the sleeve hole 142 and through one of the holes 136A-136D. In FIG. 17 the handle 94A is positioned next to the blower handle 132 wherein the removable pin 144 passes through the sleeve hole 142 and through the hole 136D in the shaft 92. Thus the sleeve 138 is locked to the shaft 92. Additionally, the removable coupling clamp 100A (shown in phantom) may clamp the blower handle 132 to the handle 94A.

FIG. 18 illustrates a plan view of the fluid shovel apparatus 10T including the shaft extension apparatus 134. The blower handle 132 is in the same location as in FIG. 17 while the handle 94A has been moved at a distance "DA" away from the blower handle 132. The removable pin 144 passes through the sleeve hole 142 and the hole 136A in the shaft 92 thus locking the sleeve 138 to the shaft 92. The sleeve 138 may be positioned closer to or farther away from the handle 132 by placing the removable pin 144 through the sleeve hole 142 and one of the shaft holes 136A-136D. Alternatively, the sleeve 138 may be locked at any desireable location on the shaft by any suitable clamping method. Therefore, the handle 94A may be positioned next to the blower handle 132.

FIG. 19 illustrates a side view of another embodiment of a fluid shovel apparatus 10U. This fluid shovel apparatus 10U is similar to the fluid shovel apparatus 10S as shown in FIG. 16, except the pressure apparatus 14AA is replaced with a remotely located pressure apparatus 14BB. The remotely located pressure apparatus 14BB may include an outlet duct 154. The remotely located pressure apparatus 14BB may include any suitable pressure source (e.g., a backpack blower, a wheeled blower, etc.). A first end 152 of a flexible duct 148 may be removably attached to the outlet duct 154 of the remotely located pressure apparatus 14BB. The first end 124A of the flexible coupling 124 is removably clamped onto a second end 150 of the flexible duct 148. The second end 124B of the flexible coupling 124 is removably clamped onto the inlet duct 31S. The remotely located pressure apparatus 14BB supplies pressurized fluid 15 through the outlet duct 154, through the flexible duct 148, through the inlet duct 31S, through the straight jet duct 33S and through the fluid exhaust port 18S. The pressurized fluid 15 is directed towards the loose pile of material 32. The operator may push the handle 94 and the blade 12S in a forward direction (direction arrow 102). The operator may pull the handle 94 and the blade 12S in a backward direction (direction arrow 103) away from the loose pile of material 32.

FIGS. 20, 21 and 22 illustrate another embodiment of a fluid shovel apparatus 10V. FIG. 20 illustrates a side view of the fluid shovel apparatus 10V. FIG. 21 illustrates a plan view of the fluid shovel apparatus 10V. FIG. 22 illustrates a front view of the fluid shovel apparatus 10V. The fluid shovel apparatus 10V includes a blade 12V, a shaft 92V, a handle 94V, a brush assembly 160, an ice scraper blade 170, a conduit system 16V and a pressure apparatus 14V. The blade 12V may be any suitable shape (e.g., concave, curving, etc.). The blade 12V further includes a protruding leading edge 27W. The blade 12V may preferably have a width "WV" of at least about 18 cm. The conduit system 16V includes a straight jet duct 33V. The fluid exhaust port 18V is an opening in the blade 12V. The fluid exhaust port 18V shape is formed by the intersection of the straight jet duct 33V and the blade 12V. The straight jet duct 33V may be attached to the blade 12V using any suitable means (e.g., hot glue, epoxy, welding, bolting, etc.). The blade may be include any suitable material (e.g., plastic, polypropylene, polycarbonate, steel, aluminum, etc.).

The pressure apparatus 14V may include an outlet duct 155V. The pressure apparatus 14V may include any suitable fluid pressure 15 source (e.g., backpack blower, a wheeled blower, a handheld blower, a gas blower, an electric blower, etc.). A first end 152V of a flexible duct 148V may be removably attached to the outlet duct 155V. The first end 124A of the flexible coupling 124 is removably clamped onto a second end 154V of the flexible duct 148V. The second end 124B of the flexible coupling 124 is removably clamped onto the straight jet duct 33V of the conduit system 16V. The conduit system 16V may be made from any suitable material (e.g., PVC, molded plastic, metal, etc.). The conduit system 16V may preferably have a diameter of at least about 4 cm. The pressure apparatus 14V supplies pressurized fluid 15 through the outlet duct 155V, through the flexible duct 148V, through the straight jet duct 33V and through the fluid exhaust port 18V in the blade 12V. The pressurized fluid 15 flows outward from the fluid exhaust port 18V in a direction towards the loose material 32.

A first end 96V of the shaft 92V is attached to the blade 12V. A second end 98V of the shaft 92V is attached to the handle 94V. A clamping assembly 167 may attach the flexible duct 148V with the shaft 92V. The operator may push the handle 94V and the blade 12V in the direction (directional arrow 102) towards the pile of loose material 32. Additionally, the operator may pull the handle 94V and the blade 12V the direction (directional arrow 103) away from the loose material 32. The pressurized fluid may include any suitable fluid (e.g., air, nitrogen, water, etc.). The fluid 15 may be air when the loose material 32 is snow.

The brush assembly 160 is attached to a lower surface 24V of the blade 12V. The ice scraper blade 170 is attached to the protruding leading edge 27W of the blade 12V. The brush assembly 160 includes a mounting member 166 and a plurality of bristles 168. The plurality of bristles 168 are attached to the mounting member 166. The bristles 168 may include any suitable no scratching material (e.g., nylon, polypropylene fiber, plastic, natural fiber, etc.). The mounting member 166 may be attached to a lower surface 24V of the blade 12V. The mounting member 166 may be attached to the lower surface 24V of the blade 12V using any suitable means (e.g., glue, bolts, epoxy, etc.). The bristles 168 may contact a support surface 29V. The mounting member 166 is attached in close proximity to the protruding leading edge 27W of the blade 12V (FIGS. 20, 21). The support surface 29V may include any suitable surface of a motor vehicle (e.g., automobile, truck, van, etc.). The operator may grip the handle 94V and may move the blade 12V in a direction (directional arrow 102) towards the pile of loose material 32 or in the direction (directional arrow 103) away from the pile of loose material 32. The bristles 168 scrub the support surface 29V. The bristles 168 are soft so that they will not damage any surface coating such as paint on the support surface 29V. The surface coating is not scratched. Optionally, the brush assembly 160 may be replaced with a soft pad (e.g., rubber, sponge, cloth fiber, etc.) attached to the lower surface 24V of the blade 12V. The pressurized fluid 15 ejecting from the fluid exhaust port 18V also blows loose material 32 away from the blade 12V. Thus, the fluid shovel apparatus 12V may be used to remove loose material 32 such as snow from the automobile, truck or van. This provides a big advantage for an automobile dealer to clear snow from parked automobiles, trucks, vans, etc.

The ice scraper blade 170 is attached to the protruding leading edge 27W of the blade 12V. The ice scraper blade 170 may be attached to the protruding leading edge 27W by any suitable means (e.g., glue, welding, bolts, rivets, etc.). Alternatively, the ice scraper blade 170N (shown in phantom in FIG. 21) may have a width "WN" less than the width "WV" of the blade 12V. The width "WN" may preferably be at least about 10 cm. The ice scraper blade 170 may include any suitable material (e.g., plastic, polycarbonate, nylon, etc.). Alternatively, the ice scraper blade 170 may be molded or formed as a portion of the protruding leading edge 27W of the blade 12V.

Figure 23:
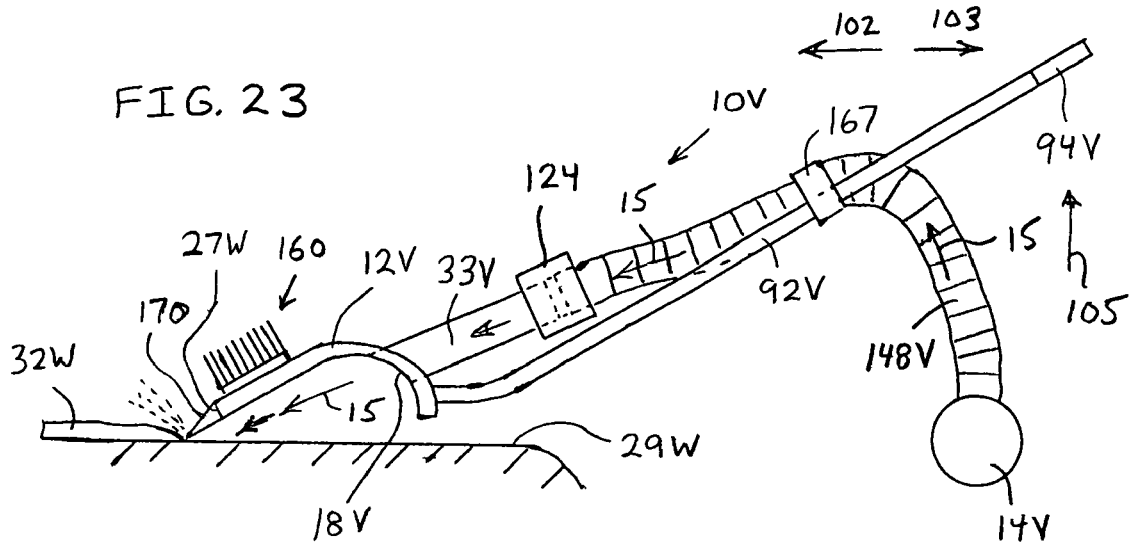
FIG. 23 illustrates a side view of the fluid shovel apparatus of FIG. 20, wherein the ice scraper blade is scraping ice from the support surface.

FIG. 23 illustrates a side view of the fluid shovel apparatus 10V, wherein the fluid shovel apparatus 10V has been inverted. The fluid shovel apparatus 10V now has the ice scraper blade 170 in contact with a support surface 29W. In this case the support surface 29W may be a windshield surface of the motor vehicle (e.g., automobile, truck, van, etc.). The support surface 29W may be coated with ice 32W on the windshield surface of the motor vehicle (e.g., automobile, truck, van, etc.). Alternatively, the support surface 29W may be any other solid support surface (e.g. deck, stairs, etc.) coated with any suitable material (e.g., icy snow, dirt, etc.). The operator may scrape the support surface 29W by moving the handle 94V of the shovel 12V in the direction (directional arrow 102) or the direction (directional arrow 103). The ice scraper blade 170 loosens and scrapes ice 32W from the surface 29W.

The pressurized fluid 15 flows from the pressure apparatus 14V through the flexible duct 148V, through the straight jet duct 33V and through the fluid exhaust port 18V in the blade 12V. The pressurized fluid 15 ejects from the fluid exhaust port 18V in a direction towards the support surface 29W. The pressurized fluid 15 may be air when ice 32W is coating the support surface 29W. As illustrated in FIG. 23, the pressurized fluid 15 ejecting from the fluid exhaust port 18V is directed towards the support surface 29W. The pressurized fluid 15 blows loosened ice 32W from the support surface 29W. When the width "WN" of the ice scraper blade 170N is narrower than the width "WV" of the blade 12V, the pressurized fluid 15 may also flow towards the support surface 29W past the ice scraper blade 170N and the protruding leading edge 27W (FIG. 21). The pressurized fluid 15 also helps remove moisture from the support surface 29W. Additionally, the operator may lift the handle 94V, the shaft 92V and the blade 12V in an upward direction (directional arrow 105, FIG. 23). The blade 12V and the ice scraper blade 170 are lifted above the support surface 29W. Then the pressurized fluid 15 ejecting from the fluid exhaust port 18V in the blade 12V may be directed towards the support surface 29W and may further blow away any remaining loosened ice 32W from the support surface 29W.

Optionally, the fluid shovel apparatus 10V may delete the shaft 92V and the handle 94V and the operator may push directly on the conduit system 16V.

Figure 24:
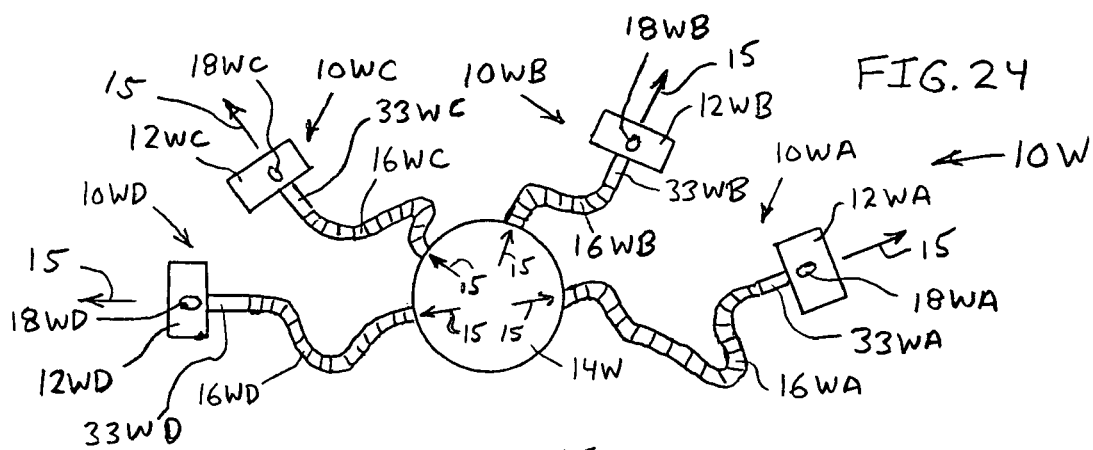
FIG. 24 illustrates a plan view of another embodiment of a fluid shovel apparatus, wherein the pressure apparatus supplies each fluid exhaust port in a plurality of blades.

FIG. 24 illustrates a plan view of another embodiment of a fluid shovel apparatus 10W. A central fluid pressure apparatus 14W supplies a plurality of individual fluid shovels apparatus 10WA, 10WB, 10WC and 10WD. Each fluid exhaust port 18WA-18WD is individually supplied pressurized fluid 15 through conduits 16WA-16WD and through each straight jet duct 33WA-33WD, respectively. Flow of pressurized fluid 15 through each conduit 16WA-16WD is supplied from the central fluid pressure apparatus 14W.

Figure 25:
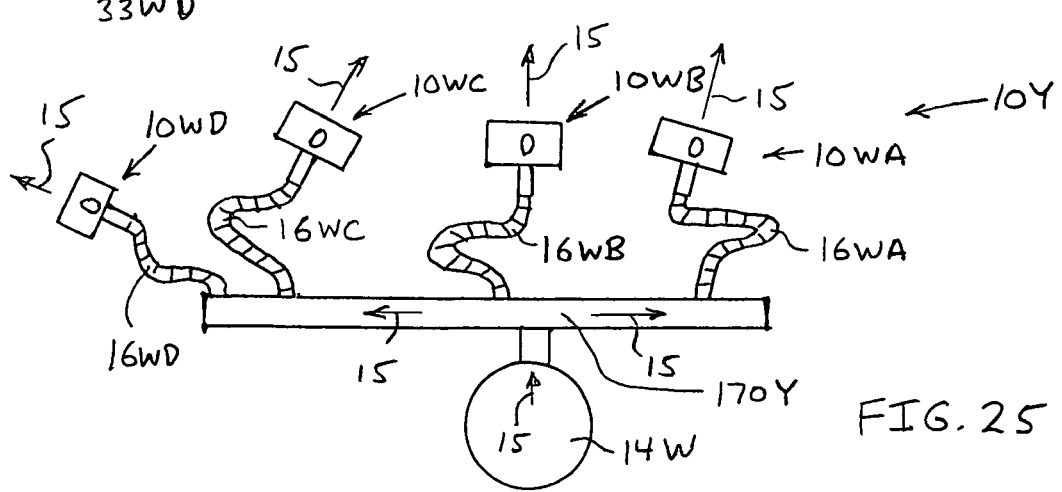
FIG. 25 illustrates a plan view of another embodiment of a fluid shovel apparatus, wherein the pressure apparatus supplies an outlet chamber connected to each fluid exhaust port in a plurality of blades.

FIG. 25 illustrates a plan view of another embodiment of the fluid shovel apparatus 10Y. The fluid shovel apparatus of 10Y is similar with the fluid shovel apparatus of 10W except that the pressurized fluid 15 flows from the central pressure apparatus 14W to an outlet chamber 170Y. Each conduit 16WA-16WD is supplied pressurized fluid 15 from the outlet chamber 170Y.

Figure 26:
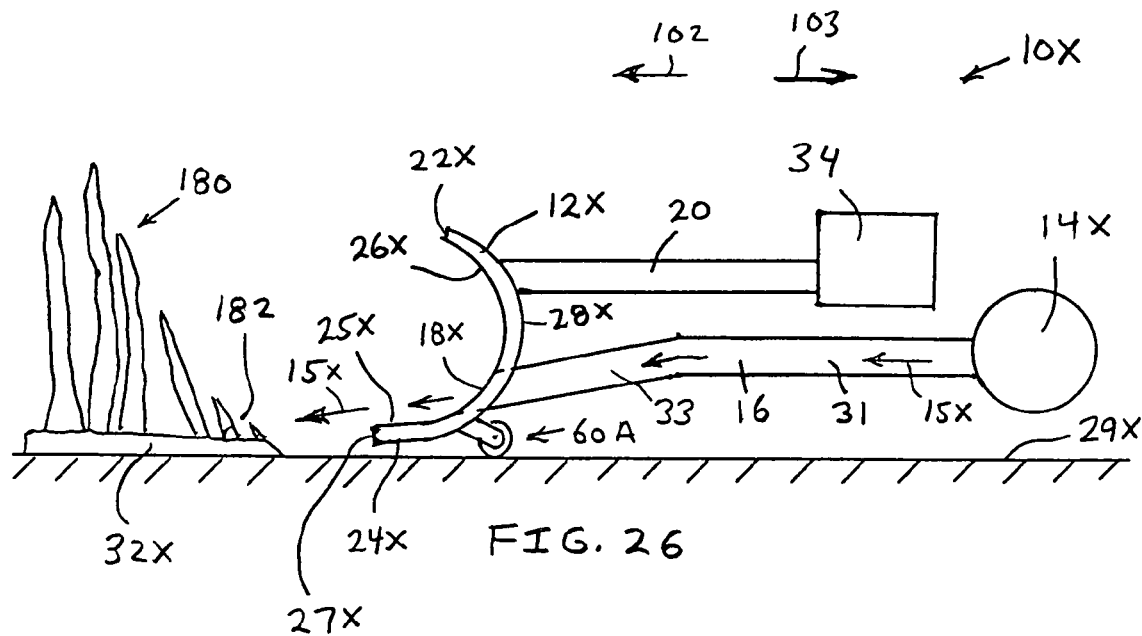
FIG. 26 illustrates another embodiment of a fluid shovel apparatus, wherein the pressurized fluid includes a fire suppressant fluid ejecting from the fluid exhaust port onto a burning material to extinguish a fire.

FIG. 26 illustrates a side view of another embodiment of the fluid shovel apparatus 10X. The fluid shovel apparatus 10X includes a concave curving blade 12X, a pressure apparatus 14X, a pressurized fluid 15X, a conduit system 16, at least one fluid exhaust port 18X and a propulsion member 20. The blade 12X includes an upper surface 22X, a lower surface 24X, a flat entrance surface 25X, a front face 26X, a leading scraper edge 27X and a rear face 28X. Additionally, the fluid shovel apparatus 10X may include the wheel assemblies 60A and 60B as shown in FIGS. 7 and 8. Alternatively, the fluid shovel apparatus 10X may include the low friction support assembly 63 as shown in FIGS. 10 and 11. The blade concave curving blade 12X may include any suitable material (e.g. steel, aluminum, high temperature steel, etc.). The conduit system 16 includes an inlet duct 31 and at least one straight jet duct 33. A support surface 29X may include any suitable surface (e.g., floor, hard packed surface, concrete surface, etc.). The pressure apparatus provides the pressurized fluid 15X. The pressure apparatus 14X may include any suitable pressure source (e.g. pump, blower, compressor, portable pump, etc.). The pressurized fluid 15X may be any suitable fluid for suppressing a fire (e.g. water, carbon dioxide, halon, fire suppressant foam, fire extinguishing gas, fire extinguishing powder, etc.). The pressurized fluid 15X flows from the pressure apparatus 14X, through the conduit system 16 and through the fluid exhaust port 18X. The fluid exhaust port 18X is an opening through the blade 12X from the rear face 28X to the front face 26X. The shape of the exhaust port 18X is formed by the junction of the straight jet duct 33 and the blade 12X. Alternatively, the fluid shovel apparatus 12X may include a plurality of fluid exhaust ports 18 supplied by the conduit system 16.

The propulsion member 20 is used to move the blade 12X in a forward direction (directional arrow 102) towards a pile of material 32X that is burning. Flames 180 are illustrated in FIG. 26. The propulsion member 20 may be attached to or pushed by a propulsion system 34. The propulsion system 34 may include any suitable propulsion means (e.g., a person, a motorized vehicle, etc.). The material 32X may include any type of flammable material (e.g., paper, wood, oil, tall brush, etc.).

As the blade 12X approaches the pile of material 32X, the pressurized fluid 15X ejecting from the fluid exhaust port 18X strikes at a base portion 182 of the flames 180 and covers the loose material 32X with the fire suppressant fluid 15X. Thus the pressurized fluid 15X knocks down the flames and covers the material 32X. Additionally, the fire suppressant fluid 15X blankets the support surface 29X with the fire suppressant 15X. Therefore, the fluid shovel apparatus 10X may be used to extinguish fires. Additionally, the blade 12X may be lifted above the support surface 29X and the pressurized fluid 15 ejecting from the fluid exhaust port 18X may be directed towards burning material 32X not lying upon the support surface 29X.

Additionally, if the pile of material 32X is not burning, the pressurized fluid 15 ejecting from the fluid exhaust port 18X may be used to remove the pile of material 32X from the support surface 29X.

Optionally, the propulsion member 20 may be deleted from the fluid shovel apparatus 10X and the propulsion system 34 may push directly on the conduit system 16 or on the pressure apparatus 14X.

Figure 27:
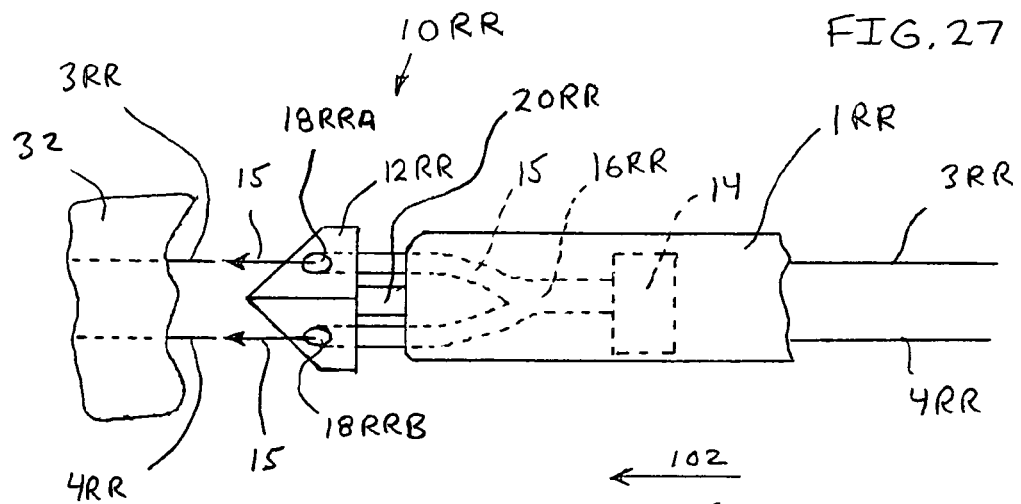
FIG. 27 illustrates a plan view another embodiment of a fluid shovel apparatus, wherein the fluid shovel apparatus is attached to a railroad train car.
Figure 28:
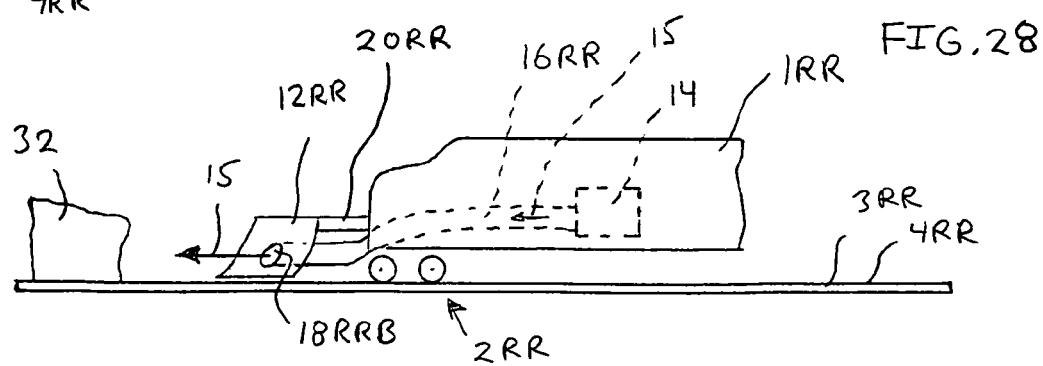
FIG. 28 illustrates a side view of the fluid shovel apparatus of FIG. 27.

FIG. 27 illustrates a plan view of another embodiment of a fluid shovel apparatus 10RR. FIG. 28 illustrates a side view of the fluid shovel apparatus 10RR. The fluid shovel apparatus 10RR includes a blade 12RR, a conduit system 16RR, a first fluid exhaust port 18RRA, a second fluid exhaust port 18RRB, the pressurized fluid 15, a propulsion member 20RR and the pressure apparatus 14. The blade 12RR is attached to the propulsion member 20RR and the propulsion member 20RR is attached to a railroad train car 1RR. The blade 12RR and the propulsion member 20RR may be removably attached to the railroad train car 1RR. The railroad train car 1RR may be any suitable train car (e.g., train engine, snow plow car, flat car, etc.). A plurality of wheel assemblies 2RR support and roll the railroad train car 1RR on a first train rail 3RR and a second train rail 4RR. The conduit system 16RR transports the pressurized fluid 15 from the pressure apparatus 14 to the fluid exhaust ports 18RRA and 18RRB. The pressurized fluid 15 ejects from the first fluid exhaust port 18RRA and is directed towards the first train rail 3RR. The pressurized fluid 15 ejects from the second fluid exhaust port 18RRB and is directed towards the second train rail 4RR. The railroad train car 1RR moves the blade 12RR in a forward direction (directional arrow 102) towards a pile of loose material 32. The loose material may be snow covering the first train rail 3RR and the second train rail 4RR. The pressurized fluid 15 ejecting from the first fluid exhaust port 18RRA blows the loose material 15 away from the first train rail 3RR. Additionally, the pressurized fluid 15 ejecting from the first fluid exhaust port 18RRA pushes loose material 32 away from the blade 12RR. The pressurized fluid 15 ejecting from the second fluid exhaust port 18RRB blows loose material 32 away from the second train rail 4RR. Additionally, the pressurized fluid 15 ejecting from the second fluid exhaust port 18RRB pushes loose material 32 away from the blade 12RR. The blade 12RR is not limited to having only fluid exhaust ports 18RRA and 18RRB, but may include any number of fluid exhaust ports 18RR with pressurized fluid 15 ejecting through each fluid exhaust port 18RR. These fluid exhaust ports 18RR blow snow away from the blade 12RR attached to the railroad train car 1RR and clear a path in front of the railroad train car 1RR. The pressure apparatus 14 supplies the pressurized fluid 15. The pressurized fluid may be air. The pressure apparatus 14 may include any suitable pressure source (e.g., pump, blower, compressor, fan, etc.). The pressure apparatus 14 may be located in any suitable location on the train car 1RR. Optionally, the pressure apparatus 14 may be located in a train car other than the railroad train car 1RR.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

We claim:

1. A fluid shovel apparatus comprising:
    a blade with a concave curving surface including a lower surface of the blade and a leading scraper edge adjacent to the lower surface of the blade;
    a flat entrance surface adjacent to the leading scraper edge of the blade;
    an upper surface of the blade;
    a rear face and a front face of the blade;
    at least one fluid exhaust port extending through the blade from the rear face of the blade to the front face of the blade; and
    a conduit system for transporting a pressurized fluid to the at least one fluid exhaust port extending through the blade, wherein the conduit system comprises at least one separate straight jet duct protruding from the rear face of the blade for each fluid exhaust port and at least one inlet duct connecting with the at least one separate straight jet duct, wherein the pressurized fluid is ejected through each fluid exhaust port extending through the blade from the rear face of the blade to the front face of the blade, wherein each straight jet duct is angled such that at least a portion of the pressurized fluid is propelled in a forward direction away from the front face of the blade and in a downward direction sweeping across the flat entrance surface and over the leading scraper edge of the blade to directly impinge upon a pile of loose material.

2. The fluid shovel apparatus of claim 1, further including a pressure apparatus for providing the pressurized fluid to the conduit system.

3. The fluid shovel apparatus of claim 1, wherein at least one fluid exhaust port is adjacent to the lower surface of the blade.

4. The fluid shovel apparatus of claim 1, wherein a centerline of at least one straight jet duct is essentially pointed at the leading scraper edge of the blade.

5. The fluid shovel apparatus of claim 1, wherein the straight jet duct is circular in cross section.

6. The fluid shovel apparatus of claim 5, wherein a length of each straight jet duct leading to each fluid exhaust port is at least about three times a diameter of the straight jet duct leading to each fluid exhaust port.

7. The fluid shovel apparatus of claim 1, wherein the leading scraper edge is in contact with a support surface when an end portion of the conduit system is located at a first height above the support surface and wherein the leading scraper edge is elevated above the support surface and at least one low friction support assembly attached to the blade contacts the support surface when the end portion of the conduit system is located at a second height above the support surface.

8. The fluid shovel apparatus of claim 7, wherein the low friction support assembly includes at least one wheel assembly, wherein each wheel assembly includes a wheel, wherein each wheel is pointed in a direction perpendicular to the leading scraper edge of the blade.

9. The fluid shovel apparatus of claim 7, wherein the low friction support assembly includes at least one skid runner.

10. The fluid shovel apparatus of claim 1, wherein at least one straight jet duct is perpendicular to the leading scraper edge.

11. The fluid shovel apparatus of claim 1, wherein at least one straight jet duct is at an acute angle relative to the leading scraper edge.

12. The fluid shovel apparatus of claim 1, wherein a yaw angle of the blade is at an angle between about 45 degrees and 90 degrees with respect to an inlet duct of the conduit system.

13. The fluid shovel apparatus of claim 2, wherein the pressure apparatus is selected from the group consisting of a gasoline engine powered blower, an electric powered blower, a backpack blower and a portable gasoline powered blower.

14. The fluid shovel apparatus of claim 2, wherein the conduit system is attached to the pressure apparatus with a flexible hose.

15. The fluid shovel apparatus of claim 1, wherein the blade is made from the group consisting of plastic, polycarbonate, steel, aluminum, fiber glass, carbon fiber, polypropylene, nylon and a fiber reinforced polymer.

16. The fluid shovel apparatus of claim 1, further including a soft pad attached to the lower surface of the blade and an ice scraper blade attached to the leading scraper edge of the blade.

17. A fluid shovel apparatus comprising:
    a blade attached to a railroad car wherein the blade includes a concave curving surface including a lower surface of the blade and a leading scraper edge adjacent to the lower surface of the blade;
    a flat entrance surface adjacent to the leading scraper edge of the blade;
    a rear face and a front face of the blade;
    at least one fluid exhaust port extending through the blade from the rear face of the blade to the front face of the blade; and
    a conduit system for transporting the pressurized air to the at least one fluid exhaust port extending through the blade, wherein the conduit system comprises at least one separate straight jet duct protruding from the rear face of the blade for each fluid exhaust port, wherein the pressurized air is ejected through each fluid exhaust port extending through the blade from the rear face of the blade to the front face of the blade wherein each straight jet duct is angled such that at least a portion of the pressurized air is propelled in a forward direction away from the front face of the blade and in a downward direction sweeping across the flat entrance surface and over the leading scraper edge of the blade to impinge upon loose material.

18. The fluid shovel apparatus of claim 17, further including a pressure apparatus for providing the pressurized air to the conduit system, wherein the pressurized air is ejected through the at least one fluid exhaust port extending through the blade in a forward direction away from the front face of the blade and in a downward direction sweeping across the flat entrance surface and over the leading scraper edge of the blade to impinge upon the loose material.

19. The fluid shovel apparatus of claim 18, wherein at least a portion of the pressurized air is ejected through a first fluid exhaust port extending through the blade and is directed in a downward direction sweeping across the flat entrance surface and over the leading scraper edge of the blade towards a first train rail and wherein at least a portion of the pressurized air is ejected through a second fluid exhaust port extending through the blade and is directed in a downward direction sweeping across the flat entrance surface and over the leading scraper edge of the blade towards a second train rail.

20. A method for pushing and lifting loose material from train rails, comprising the steps of:
- providing a blade with a concave curving surface including a lower surface of the blade and a leading scraper edge adjacent to the lower surface of the blade;
- providing a flat entrance surface adjacent to the leading scraper edge of the blade;
- attaching the blade to a railroad train car;
- providing a rear face and a front face of the blade;
- providing at least one fluid exhaust port extending through the blade from the rear face of the blade to the front face of the blade;
- providing a conduit system for transporting pressurized air to the at least one fluid exhaust port extending through the blade, wherein the conduit system comprises at least one separate straight jet duct protruding from the rear face of the blade for each fluid exhaust port;
- wherein the pressurized air is ejecting through at least one fluid exhaust port in a downward direction sweeping across the flat entrance surface and over the leading scraper edge of the blade towards a first train rail and wherein pressurized air is ejecting through extending through the blade from the rear face of the blade to the front face of the blade, wherein at least a portion of the pressurized air is propelled in a forward direction away from the front face of the blade and at least one fluid exhaust port directed in a downward direction sweeping across the flat entrance surface and over the leading scraper edge of the blade towards a second train rail; and
- wherein the railroad train car pushes the blade towards a pile of loose material.

* * * * *